O. DE WERTHERN.
TIRE CARRYING DEVICE.
APPLICATION FILED MAR. 15, 1920.

1,359,676.  Patented Nov. 23, 1920.

INVENTOR
O. DE WERTHERN
BY
ATTORNEY

UNITED STATES PATENT OFFICE.

OLIVER DE WERTHERN, OF ST. LOUIS, MISSOURI.

TIRE-CARRYING DEVICE.

1,359,676.        Specification of Letters Patent.    Patented Nov. 23, 1920.

Application filed March 15, 1920. Serial No. 365,890.

*To all whom it may concern:*

Be it known that I, OLIVER DE WERTHERN, a citizen of the United States of America, residing at the city of St. Louis, State of Missouri, United States of America, have invented a certain new and useful Tire-Carrying Device, of which the following is such a full, clear, and exact description as will enable any one skilled in the art to which it appertains to make and use the same reference being had to the accompanying drawings, forming part of this specification.

My invention relates to a tire carrying device adapted to secure the tire and more particularly an inflated tire mounted on a rim or wheel against the side wall of the body of a motor vehicle.

Figure 1:
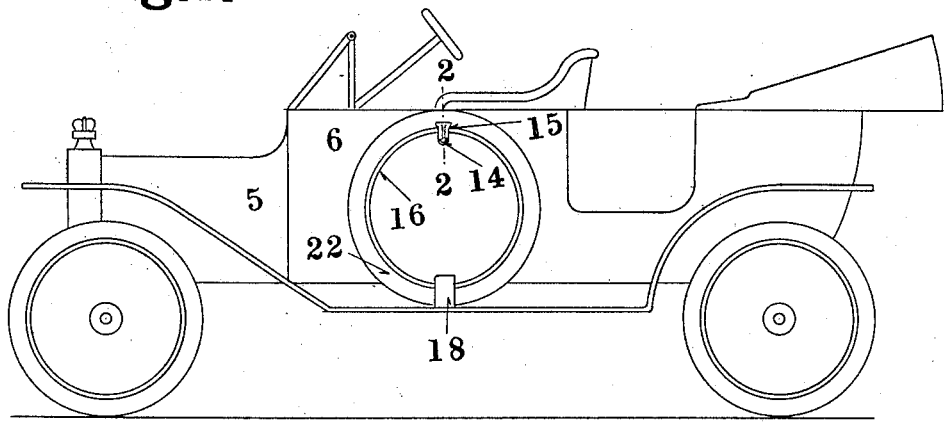
Figure 2:
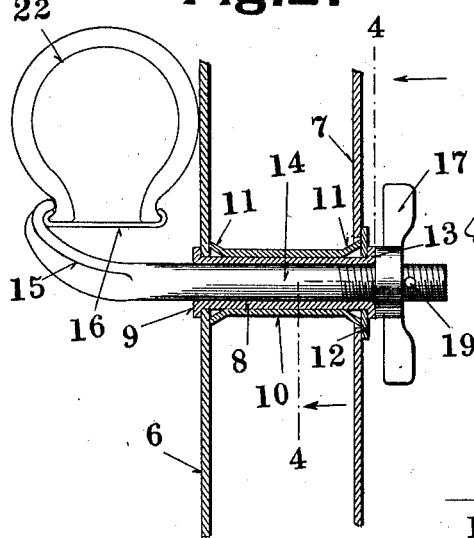
Figure 3:
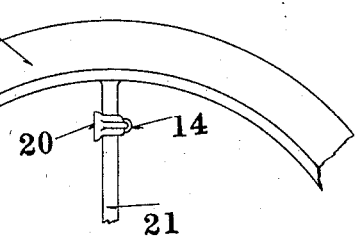
Figure 4:
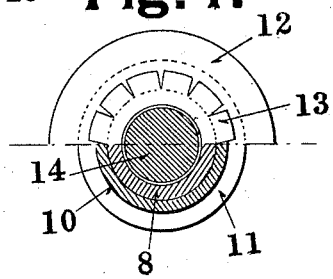

In the accompanying drawings which illustrate one form of tire carrying device made in accordance with my invention together with a motor vehicle to which the same is applied, Figure 1 is a side elevation, Fig. 2 is an enlarged section taken on the line 2—2 of Fig. 1, Fig. 3 is a detailed view showing a slight modification, and Fig. 4 is an enlarged section taken on the line 4—4 of Fig. 2.

5 indicates a motor vehicle to the side wall 6 of which my tire carrying device is applied. The wall 6 is duplex being provided with an inner side 7 which is usually made of light material such as card board. Passing through the sides 6 and 7 of the wall is a sleeve 8 provided at its outer end with a flange 9 adapted to bear against the outside of the part 6 of the wall. Surrounding the sleeve 8 is a collar 10 provided at each end with an enlarged portion 11, preferably made by expanding the ends of the tube forming the collar 10. One of these enlarged portions 11 bears against the inner face of the side 6 of the wall opposite to the flange 9 thus securely clamping the side 6 between the said parts 9 and 11. Surrounding the sleeve 8 is a washer 12 which bears against the other of the enlarged ends 11 and overlaps the inner side 7 of the wall. This washer 12 is held in position by means of a flange 13 formed by radially slitting the inner end of the sleeve 8 and bending the parts over as best shown in Fig. 4. 14 is the stem of a hook member which passes through the sleeve 8 and terminates at its outer end in a hook 15 adapted to engage with a demountable rim 16 carrying the tire 22. The inner end of the stem 14 is threaded and is provided with a wing nut 17 by means of which the stem is adapted to be drawn inwardly to cause the hook 15 to firmly clamp the tire 22 against the wall of the vehicle. The lower part of the tire 22 is engaged by any suitable retaining device 18 secured to the side of the vehicle. In order to secure the wing nut 17 in position, I provide the stem 14 with an opening 19 adapted to receive a padlock or other suitable locking device.

In Fig. 3 I have shown a slight modification in which the stem 14 is provided with a hook 20 of such form as to engage with the spoke 21 of a wheel carrying the tire 22 when it is desired to carry an entire wheel in place of a demountable rim.

Having fully described my invention, what I claim as new and desire to secure by Letters Patent of the United States is:

1. In a device of the class described, the combination with the duplex wall of a motor vehicle body, of a flanged sleeve passing through said wall, a collar surrounding said sleeve and bearing against one side of the wall, a removable member surrounding said sleeve and bearing against said collar, and a tire engaging member extending through said sleeve.

2. In a device of the class described, the combination with the duplex wall of a motor vehicle body, of a flanged sleeve passing through said wall, a collar surrounding said sleeve and bearing against one side of the wall, a washer surrounding said sleeve and bearing against said collar, said washer overlapping the other side of said wall, and a tire engaging member extending through said sleeve.

3. In a device of the class described, the combination with the duplex wall of a motor vehicle body, of a sleeve passing through said wall and provided at one end with a flange adapted to bear against one side of the wall, said sleeve being provided with radial slots at the end opposite to the flange, said slotted portion being adapted to be bent to form a second flange, a collar surrounding said sleeve and coöperating with said flange to clamp one side of the wall, and a tire engaging member extending through said sleeve.

4. In a device of the class described, the combination with the duplex wall of a motor vehicle body, of a sleeve passing through said wall and provided at one end with a flange adapted to bear against one side of the wall, said sleeve being provided with radial slots at the end opposite to the flange, said slotted portion being adapted to be bent to form a second flange, a collar surrounding said sleeve and provided with enlarged ends, and a tire engaging member extending through said sleeve.

5. In a device of the class described, the combination with the duplex wall of a motor vehicle body, of a sleeve passing through said wall and provided at one end with a flange adapted to bear against one side of the wall, said sleeve being provided with radial slots at the end opposite to the flange, a collar surrounding said sleeve and coöperating with the flange to clamp one side of the wall, a washer surrounding said sleeve and overlapping the other side of the wall, said washer being secured in position by bending the slotted end of said sleeve, and a tire engaging member extending through said sleeve.

6. In a device of the class described, the combination with the duplex wall of a motor vehicle body, of a sleeve passing through said wall and provided at one end with a flange adapted to bear against one side of the wall, said sleeve being provided with radial slots at the end opposite to the flange, a collar surrounding said sleeve and provided with enlarged ends, a washer surrounding said sleeve and overlapping the other side of the wall, said washer being secured in position against one of the enlarged ends of the collar by bending the slotted end of said sleeve, and a tire engaging member extending through said sleeve.

In testimony whereof I have hereunto set my hand and affixed my seal.

OLIVER De WERTHERN. [L. S.]